United States Patent [19]
Ito et al.

[11] 3,982,254
[45] Sept. 21, 1976

[54] DIGITAL INDICATION SYSTEM FOR A CAMERA

[75] Inventors: Tadashi Ito, Kanagawa; Soichi Nakamoto, Machida; Sadao Yamada, Kanagawa, all of Japan

[73] Assignees: Canon Kabushiki Kaisha, Tokyo; Tokyo Shibaura Electric Co., Ltd., both of Japan

[22] Filed: Mar. 24, 1975

[21] Appl. No.: 561,624

[30] Foreign Application Priority Data
Mar. 29, 1974 Japan............................ 49-35772

[52] U.S. Cl.................................. 354/53; 354/219; 356/226
[51] Int. Cl.²......................................... G03B 17/20
[58] Field of Search ................ 354/53, 219, 26, 29, 354/30, 60 L; 356/226, 227

[56] References Cited
UNITED STATES PATENTS

| | | | |
|---|---|---|---|
| 3,727,527 | 4/1973 | Borowski et al. | 354/53 |
| 3,818,495 | 6/1974 | Sagara et al. | 354/219 X |
| 3,876,876 | 4/1975 | Kitai et al. | 354/53 X |
| 3,895,875 | 7/1975 | Kitaura et al. | 354/53 X |

Primary Examiner—R. L. Moses
Attorney, Agent, or Firm—Toren, McGeady and Stanger

[57] ABSTRACT

An indication system of a camera which allows the use of an indication system such that photographing information of a camera is indicated with illumination by a plural number of indication elements being positioned in parallel. Further such letters and symbols which distinguish different kinds of photographing information are indicated by at least a part of the plural number of indication elements.

14 Claims, 9 Drawing Figures

DIGITAL INDICATION SYSTEM FOR A CAMERA

BACKGROUND OF THE INVENTION

1. Field of the Invention

The present invention relates to an indication system for photographing information of a camera, especially to an indication system to indicate various kinds of photographing information digitally.

2. Description of the Prior Art

There is a kind of photographing information indication system wherein a plual number of semi-conductor illuminant elements are positioned within a finder of a camera to clearly indicate shutter time value, diaphragm aperture value, etc., with digits and symbols, etc., by illumination with said elements. In this kind of indication device, generally, elements with four figures or so are used to clearly indicate shutter time, diaphragm aperture value, etc., using seven segment indication elements. In a recent high class single lens reflex camera, etc., shutter time covers such wide range of a fraction of thousands of a second to several tens of seconds and also can have its photographing mode changed over from shutter preference to diaphragm aperture preference. Thus as numbers with four figures or so are used for indication when the above information indication system is employed, the distinction between long time (1 second or longer) and short time (a fraction of a second) of shutter time and the distinction between shutter time indication and F-value indication becomes difficult, causing inconvenience in using a camera.

SUMMARY OF THE INVENTION

An object of the present invention is to provide a phtographing information indication system of a camera in which at least one of two exposure determining factors, shutter time and diaphragm aperture is variable. The system is characterized in that, in indicating values selected from said variable exposure determining factors in letters and symbols, etc., by plural number of indication elements as photographing information, marks to distinguish the content of said indication are placed at the head or end of the indication.

Another object of the present invention is to provide a photoghaphing information indication system of a camera in which either one of two exposure determining factors, shutter time and diaphragm aperture is the preferred mode or of a camera in which any one of said two exposure determining factors can be made as the preference mode by change over. In this manner the camera is suitable for indicating such shutter time value or diaphragm aperture value as being the results of an operation to obtain appropriate exposure based on the preference mode as photographing information. Furthermore, the system is for indicating the preset value of the above mentioned preference mode in alternation with the above mentioned operation value at any desired time.

Another object of the present invention is to provide an indication system in which shutter time value or diaphragm aperture value is indicated as being clearly distinguished therebetween using four pieces of segment elements being positioned in parallel, for reducing the number of illuminant elements necessary for indication of photographing information of a camera to as small as possible.

Further, another object of the present invention is to provide an indication system of a camera in which indication is made by adding a letter or symbol for distinguishing the content of indication to the head or end of the above mentioned information indication, to clearly distinguish a short time and a long time in indicating shutter time using segment elements with four figures.

Since the distinction of high speed or low speed of the shutter time and diaphragm aperture value, etc., can be clearly distinguished using very small numbers of indication elements in an indication system of the present invention, a clear indication device for various photographing information can be made for a camera having a wide range of shutter time and a device allowing change over between shutter preference and diaphragm aperture preference is provided. Further, the indication thereof can be made extremely clear and further, cost can be reduced and space can be saved as the number of illuminant elements is small. Accordingly, its effect in camera designing is very great.

BRIEF DESCRIPTION OF THE DRAWINGS

FIG. 1 (a) (b) (c) are a front elevation, a plane, and a rear elevation view, showing external appearance of a camera allowing both preferences for shutter time or diaphragm aperture, being suitable for incorporating an indication system for a camera according to the present invention.

DETAILED DESCRIPTION OF PREFERRED EMBODIMENTS

Figure 1A:
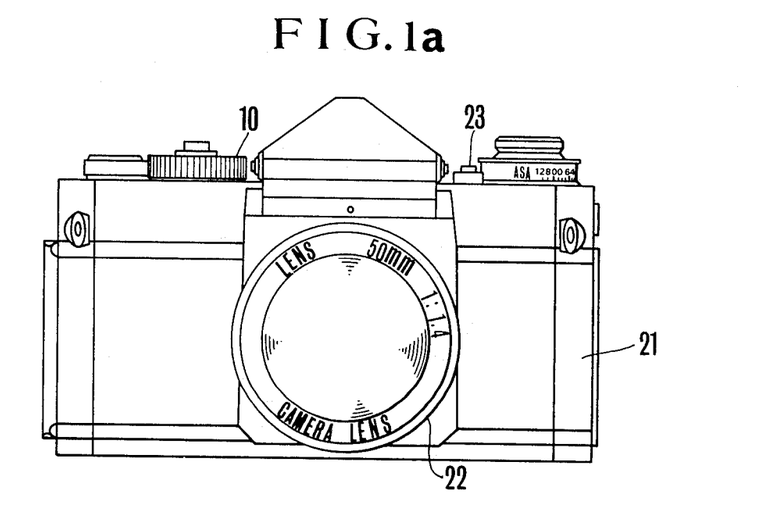
Figure 1B:
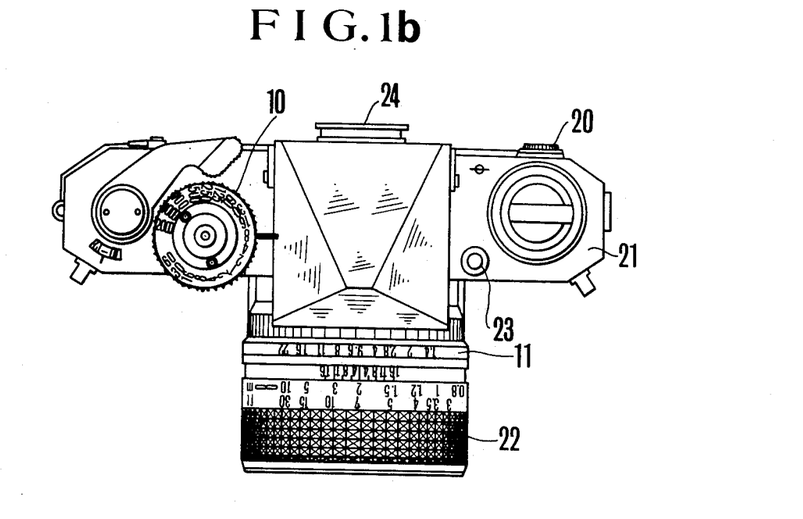
Figure 1C:
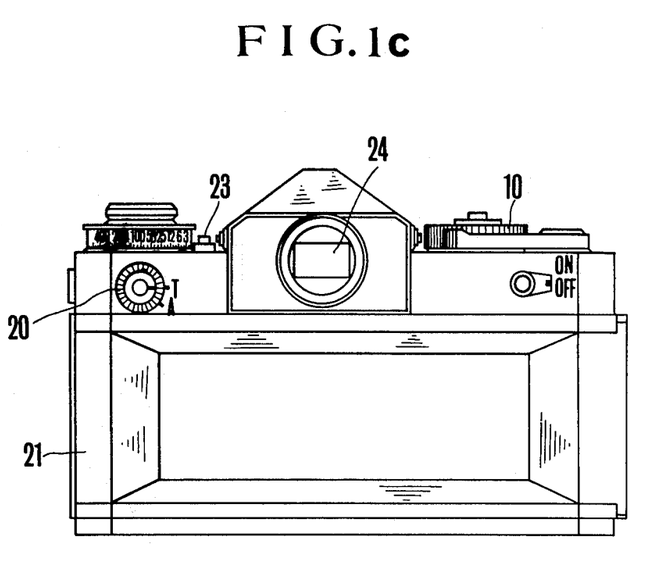

FIG. 1 (a) (b) (c) are a front elevation, a plan, and a rear elevation showing external appearance of a camera allowing both preferences of shutter time or diaphragm aperture, being suitable for incorporating an example of an indication system of a camera according to the present invention. In said drawings, 21 is a camera body, 22 is a lens barrel, 10 is a shutter time setting means, 11 is a diaphragm aperture setting means, 20 is a preference mode change over switch having a shutter time preference position T and a diaphragm aperture preference position A, 23 is a push button switch for preset value indication, and 24 is a finder. In the above set-up, when the preference mode change over switch 20 is changed over to the side of shutter time preference position T, diaphragm aperture value for obtaining appropriate exposure is operated based on shutter time set by the shutter time setting means 10, and the diaphragm aperture value as a result of operation is indicated as photographing information within a finder. At this time, as the preset value indication push button switch 23 is pressed, the preset shutter time value is indicated at a same place in lieu of the above mentioned indication of diaphragm aperture value, therefore confirmation of preset value can be made. After this as the shutter is released, exposure will be made based on said shutter time value and diaphragm aperture value. Such indication of photographing information can be made not only within a finder but wherever noticeable by a photographer such as a surface of a camera body.

Figure 2:
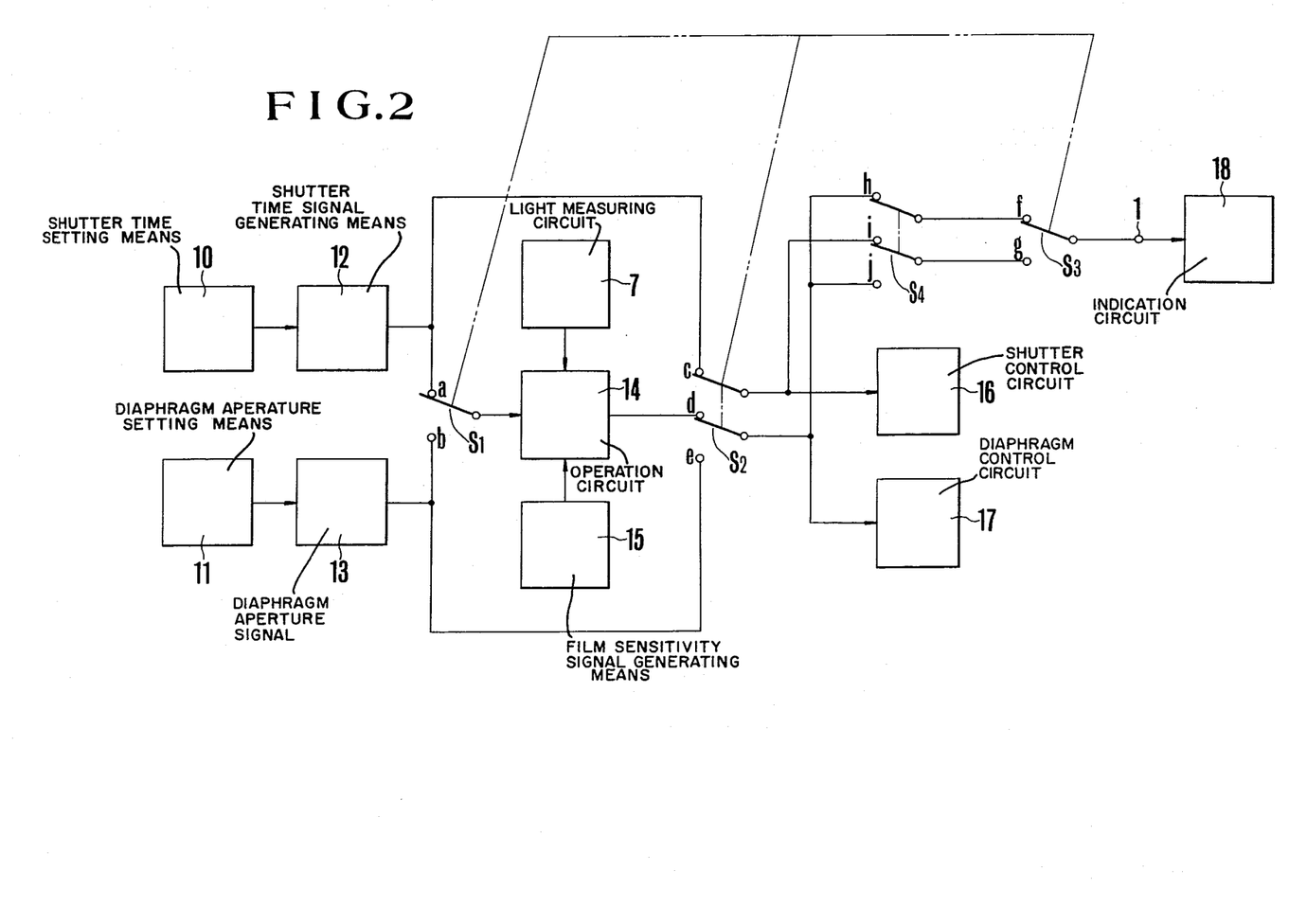
FIG. 2 is a block line diagram to show an example of an indication system according to the present invention.

FIG. 2 is a block line diagram to show an example of an indication system according to the present invention. In said drawing, 10 is a shutter time setting means, 12 is a shutter time signal generating means to generate electric signal in an association with said shutter time setting means, 11 is a diaphragm aperture setting means, 13 is a diaphragm aperture signal generating means to generate electric signal in an association with said diaphragm aperture setting means, 7 is a light measuring circuit, 15 is a film sensitivity signal generating means, and 14 is an operation circuit to have either one of the shutter time signal or the diaphragm aperture signal being inputted through a switch $S_1$, the signal from the light measuring circuit 7, and the signal from the film sensitivity signal generating means 15 inputted thereinto and operated, wherein the output of its operation result is the diaphragm aperture signal when the input is shutter time signal, and is the shutter time signal when the input is diaphragm aperture signal. 16 is a shutter control circuit, 17 is a diaphragm control circuit, 18 is an indication circuit, and $S_1$, $S_2$, $S_3$ are switches linked with the preference mode change over switch, and the contacts $a$, $c$, $d$, $f$ sides thereof become ON in the case of the shutter time preference mode. $S_4$ is a switch linked with the preset value indication push button switch and its side with contacts $h$, $i$, becomes ON normally.

In the above mentioned arrangement, in the case of shutter time preference the switches $S_1$, $S_2$, $S_3$ are in the state shown in the drawing, then shutter time signal from the shutter time signal generating means is inputted into the operation circuit 14 and the shutter control circuit 16 based on the shutter time set by the shutter time setting means 10. The operation circuit 14 conducts operation based on said shutter time signal, the signal from the light measuring circuit 7 and the signal from the film sensitivity signal generating means 15 and inputs such diaphragm aperture signal as obtaining appropriate exposure into the diaphragm aperture control circuit 17. While the indication circuit 18 at this time indicates diaphragm aperture value, as the present value indication push button switch is pressed the switch $S_4$ is changed over, and the indication circuit 18 indicates shutter time value. As shutter release is done after that, the shutter control circuit 16, the diaphragm aperture control circuit 17 function to conduct exposure. In the case of diaphragm aperture preference, the switches $S_1$, $S_2$, $S_3$ are changed over in an association with the preference mode change over switch and the side with contacts $b$, $d$, $e$, $g$, become ON and operation control is done based on such diaphragm aperture as being set by the diaphragm aperture setting means 11 in a same manner as in the above mentioned shutter time preference. At this time, the indication circuit 18 indicates shutter time value and the diaphragm aperture value will be indicated when the preset value indication push button switch is pressed.

While, the shutter control circuit 16 and the diaphragm aperture control circuit 17 are linked with the operation result in the above set-up, the indication system of the present invention is effective also in such set-up that for example, at the time of shutter time preference, the diaphragm aperture value as a result of operation is indicated at the indication circuit 18 and the diaphragm aperture setting means 11 is manually operated based on said indication for setting the same to appropriate exposure. Furthermore, the indication system of the present invention is effective in such set-up that the output of the switch $S_1$ is inputted as it is into the indication circuit 18 and the setting state of shutter time and diaphragm aperture at that time is indicated in a camera which has no operation circuit, etc. and no preference mode system.

Figure 3:
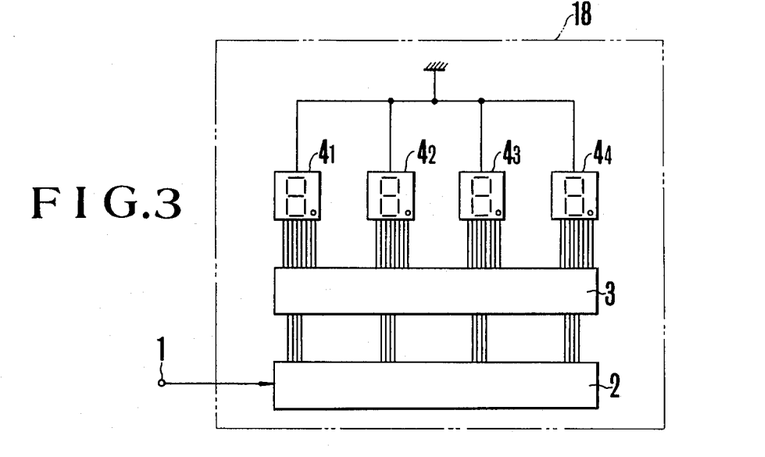
FIG. 3 is a circuit set-up diagram to show details of an indication circuit, of a static drive type by a digital control.
Figure 4:
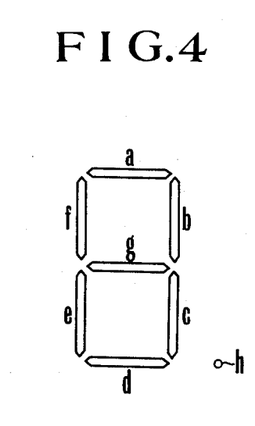
FIG. 4 is a drawing to show an example of a segment indication element.

FIG. 3 is a circuit set-up diagram to show details of the indication circuit 18, showing an indication circuit of a static drive type by digital control. In this drawing, 1 is an input terminal of digital photographing information, into which various digital information is inputted from the operation circuit, etc., 2 is a data register to memorize inputted information and to read out the same as required for conducting control of various mechanisms, indication and other. 2 also serves as a converter for indication in this drawing, coding the symbol indicated at each segment indication element and inputting the same into the decoder drive 3 through 4 wire circuit, respectively. $4_1$ to $4_4$ are segment indication elements consisting of illuminant diodes, etc., and in this drawing consisting of seven segment indication element which can indicate digits of 0 to 9 and other symbols and a decimal point indication element, wherein four of them are positioned in parallel for making indication of the maximum of four figures. Also, one example of arrangement of each segment of the segment indication elements $a$ to $h$ composing the indication elements at each figure is shown in FIG. 4. However, the segment indication elements do not have to be those shown in the drawing, instead they can be ones which can indicate digits of 0 to 9 and at least two other symbols.

Function in FIG. 3 is as follows. That is, digitalized shutter time information and diaphragm aperture information are inputted into the input terminal 1, and are memorized by Tv, Av registers, respectively at the data register 2. These digital informations are converted into for example, binary codes and read out by an indication converter in the data register 2, and inputted into the decoder drive 3. They are decoded at 3 from binary codes into such signals as driving seven segment indication elements, and the output thereof is sent to each of indication elements $4_1$ to $4_4$. Each figure indication element for $4_1$ to $4_4$ illuminatingly indicates such letters and symbols as corresponding to the signal from the decoder driver 3. By the above, for example, shutter time value or diaphragm aperture value is clearly indicated within a finder.

Figure 5:
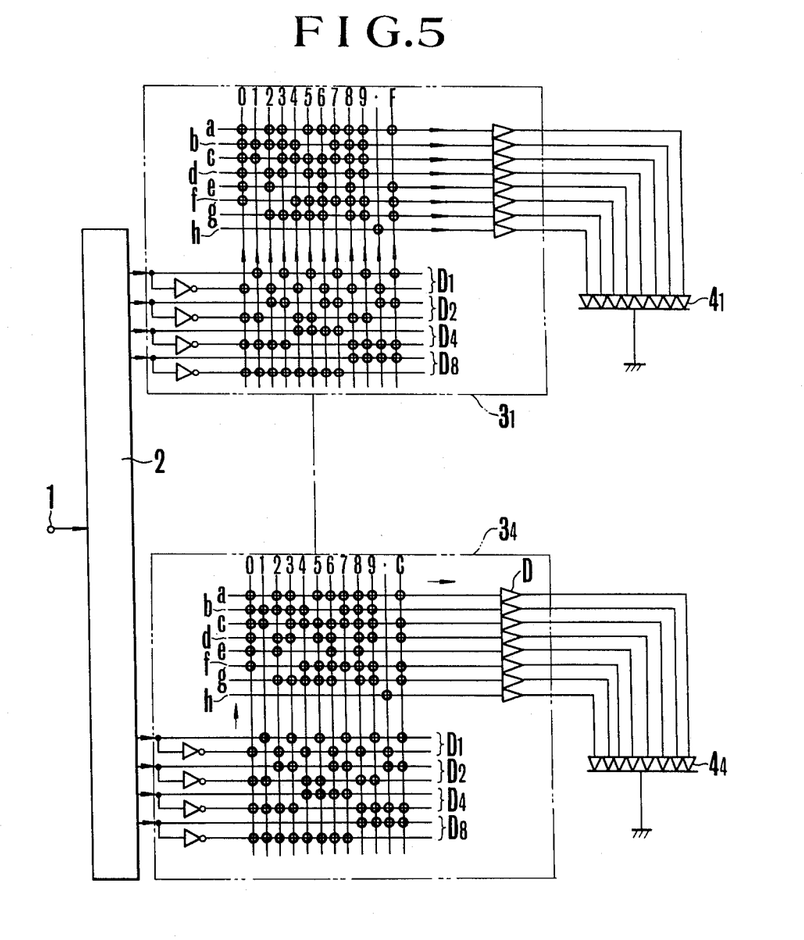
FIG. 5 is a circuit connection diagram to show an example of an indication circuit.

FIG. 5 is a circuit connection diagram to show an example of an indication circuit according to the indication system of the present invention. Same components as in FIG. 3 are shown with same numbers and marks, and $3_1$ is a part of the circuit of the decoder drive 3, and is a circuit for the segment indication element for the first figure, showing the symbol F besides digits. Similarly, $3_4$ is a circuit for the segment indication element for the 4th figure to indicate the symbol S besides digits.

The function at FIG. 5 will be as follows. That is, suppose the operation result for appropriate exposure when a camera is pointed toward an object and a certain diaphragm aperture value is set changing over to diaphragm aperture preference mode is 1/2000 second shutter time, such digital signal as corresponding to 1/2000 second is inputted into the input terminal 1 for indicating this photographing information, and is memorized at Tv register of 2. This is coded into binary code of "$D_8\ D_4\ D_2\ D_1$" and is read out, and such binary code 0010 as corresponding to 2 in the first figure is inputted into the decoder driver $3_1$. Then "$a\ b\ d\ e\ g$" out of the line of driver become ON and its output causes segments $a, b, d, e, g$ of the segment indication elements consisting of illuminant diodes to emit light through an anode driver. By this, the digit 2 is indicated. Similarly, the segments $a, b, c, d, e, f$ emit light at second to fourth figures, thereby the indication of 2000 is made to inform a photographer that the shutter time is 1/2000 second. Next, function at the time when such long time exposure value as 1 to 60 seconds of shutter time value is indicated will be explained. For example, to indicate 60 seconds, similarly as above, 0110 is inputted at the first figure while 0000 is inputted at the second figure to indicate 6 andd 0, respectively, and nothing is inputted into the third figure, while 1011 corresponding to S is inputted into the fourth figure. Therefore, indication mode will be 60S. The last 5(S) in said indication expresses that the shutter time value is within low speed range, making indication of 60 S that is shutter time of 60 seconds. Here, in the case of 1/60 second the indication mode will be simply 60, thus the 1/60 second and the 60 seconds can be distinctly distinguished.

Next, explanations will be made on the function in a case when the preference mode is shutter preference. In this case, digital signal of diaphragm aperture value is inputted as an operation result. For example, when diaphragm aperture value is 5.6, such binary code 1011 as corresponding to F in the first figure is inputted into the decoder driver $3_1$, while such binary codes as corresponding to 5 for the second figure, decimal point for the third figure, and 6 for the fourth figure are inputted into the decoder driver, respectively, and illuminating indication as F5.6 will be made. That is, when indication F is at the first figure it will be known that it is an indication of diaphragm aperture value, and when such indication is made it will be known that a camera is at the state being changed over to shutter preference. Thus four figure segment elements are used to indicate the long time range and the short time range of shutter time, and diaphragm aperture value being distinctly distinguished.

Figure 6:
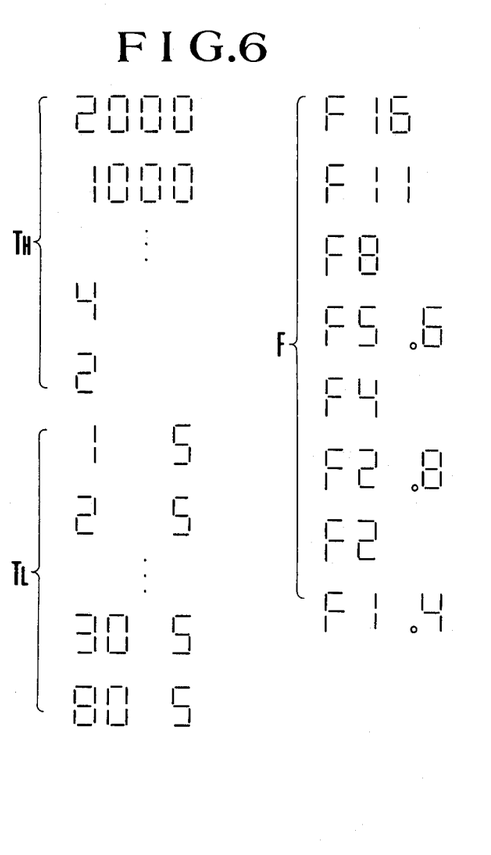
FIG. 6 is a drawing to show an example of indication patterns.

While the indication of F is made in the first figure in this example, the indication of F may be made in the fourth figure. Also the indication of the shutter time value can be made for the intermediate indication of multiple series shown in FIG. 6.

Figure 7:
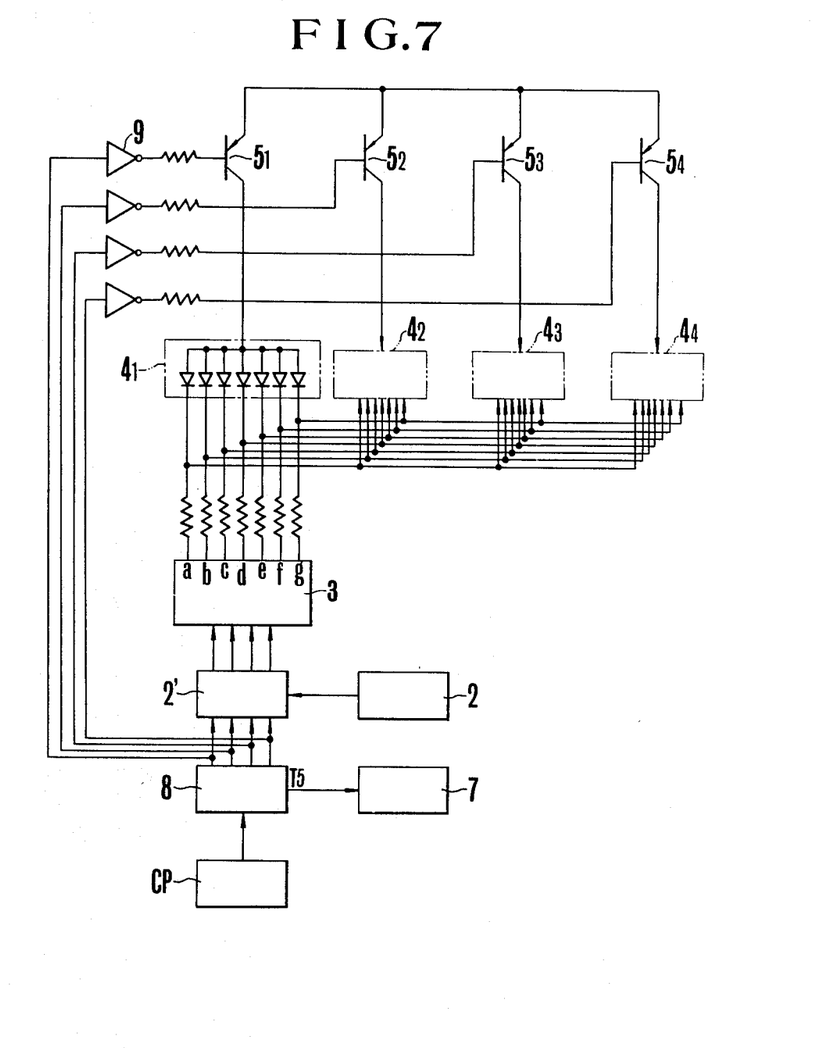
FIG. 7 is a circuit set-up diagram to show another example of an indication circuit of a dynamic drive type.

Next, FIG. 7 is a circuit set-up diagram to show another example of an indication circuit, as employed in an indication device of a dynamic drive type. In the device shown in this drawing, the light measuring circuit for an object brightness and the information indication circuit are activated in a time sharing manner with the signal from a timing pulse generator controlled by clock pulse, so that light measuring error by stray light from an indication device is prevented. In the drawing, 2 to 5 show similar parts as in FIG. 3, and 2' showss indication conversion part within the data register 2. 7 is a light measuring circuit, 8 is a timing pulse generating circuit, and 9 is an inverter. In the drawing, $T_1$ to $T_4$ out of output pulses of the timing pulse generating circuit 8 controlled by the pulse from a clock pulse oscillator CP activates the indication circuit while $T_5$ activates the light measuring circuit 7. By this timing pulse $T_1$ to $T_4$ indication signal A to D is outputted time series-wise from the indication conversion circuit 2' of the data register 2 and is inputted to the decoder driver 3. Segment drive signal for a to g is obtained at the output of 3, and is lead in parallel to illuminant diode group constituting each seven segment element. On the other hand, the timing pulse 8 is inputted into the switching transistors $5_1$ to $5_4$ through an inverter 9, and indication elements $4_1$ to $4_4$ are made to emit light with the output thereof. That is, each illuminant element is made to emit light in time sharing manner by the timing pulses $T_1$ to $T_4$, and at the stopping time of indication the light measuring circuit is activated in time sharing manner by $T_5$ to have brightness information outputted at the output of said circuit. By doing this, the decoder driver 3 can be only one group thus simplifying the device.

What is claimed is:
1. An indication system of a camera comprising:
   a. a shutter time setting means;
   b. a shutter time signal generating means coupled with said shutter time setting means to generate a shutter time signal;
   c. a diaphragm aperture setting means;
   d. a diaphragm aperture signal generating means, coupled with said diaphragm aperture setting means to generate a diaphragm aperture signal;
   e. a first switching means responsive to said shutter time signal and said diaphragm aperture signal, for selecting one of said signals and for supplying said selected signal as an output signal; and
   f. an indication circuit responsive to the output of said first switching means and having:
      a register means being coupled to the output of said first switching means for memorizing and reading out digital information being supplied from said first switching means,
      a decoder means for converting the information read out by the register means into a representative signal for indicating the related information, and
      an indication means responsive to the signal from the decoder means for digitally indicating said information and for distinguishing the content of said information in a part of said digital indication.

2. An indication system according to claim 1, in which the decoder means generates a signal for indicating symbols so as to distinguish shutter time value and diaphragm aperture value, said signal being supplied to the indication means.

3. An indication system according to claim 1, in which the decoder means generates a signal for indicating symbols so as to distinguish a shutter time value of less than 1 second and the shutter time value of 1 second or longer, said indicating symbol being supplied to the indication means.

4. An indication system according to claim 1, in which the indication means consists of four pieces of segment indication elements being positioned in parallel, wherein said segment indication elements indicate digits of 0 to 9, a decimal point, and at least two symbols by selective function of the segments.

5. An indication system according to claim 4, in which indication of F is performed along with the indication of diaphragm aperture value for indicating the shutter time value and the diaphragm aperture value.

6. An indication means according to claim 4, in which, when the shutter time value is indicated for the shutter time of less than 1 second, indication of its reciprocal number is made, while indication of S is made along with said shutter time of 1 second or longer.

7. An indication system of a camera comprising:
   a. a shutter time setting means;
   b. a shutter time signal generating means coupled with said shutter time setting means to generate a shutter time signal;
   c. a diaphragm aperture setting means;
   d. a diaphragm aperture signal generating means, coupled with said diaphragm aperture setting means to generate a diaphragm aperture signal;
   e. a first switching means responsive to said shutter time signal and said diaphragm signal, for selecting one of said signals and for supplying said selected signal as an output signal; and
   f. an indication circuit comprising:
      a clock pulse generating means,
      a register means, being coupled to the output of said first switching means for memorizing and reading out digital information being supplied from said first switching means,
      a decoder means for converting the information read out by said register means into a representative signal for indicating the related information,
      an indication means including a plural number of indication elements positioned in parallel, responsive to the signal from the decoder means, for making digital indication of information and for distinguishing the content of information by a portion of said digital indication,
      a control means to control the indication time of the indication means, and
      a timing pulse generating means, which generates a timing pulse employing the clock pulse from the clock pulse generating means so as to supply said timing pulse into the register means and the control means for indicating a plural number of indication elements by time sharing.

8. An indication system according to claim 7, which further has an object brightness sensing means, wherein said timing pulse generating means supplies said timing pulse into the register means, the control means, and the object brightness sensing means for activating a plural number of each indication element and the object brightness sensing means by time sharing.

9. An indication system of a camera, comprising:
   a. a diaphragm aperture setting means;
   b. a diaphragm aperture signal generating means coupled with said diaphragm aperture setting means to generate a diaphragm aperture signal;
   c. an object brightness sensing means which detects an object brightness to generate an object brightness signal;
   d. a film sensitivity signal generating means, which detects film sensitivity and generates a film sensitivity signal;
   e. an operation means responsive to the diaphragm aperture signal, the object brightness signal and the film sensitivity signal, for generating a shutter time signal for obtaining appropriate exposure;
   a shutter time control means responsive to the shutter time signal for controlling shutter time at the time of exposure; and
   g. an indication circuit responsive to the output signal from said operation means, having:
      a register means for memorizing and and reading out digital information being supplied to the operation circuit, etc. of a camera,
      a decoder means which converts the information read out by said register means into a representative signal for indicating the information, and
      an indication means responsive to the signal from the decoder means to make digital indication of information and for distinguishing the content of information by a portion of said digital indication.

10. An indication system of a camera according to claim 9, which has a fourth switching means which selects from the output signal from the operation means and the diaphragm aperture signal from the diaphragm aperture signal generating means for supplying the selected one of the two into the indication circuit.

11. An indication system of a camera, comprising:
   a. shutter time setting means;
   b. a shutter time signal generating means, coupled with said shutter time setting means to generate a shutter time signal;
   c. an object brightness sensing means which detects object brightness and generates an object brightness signal;
   d. a film sensitivity signal generating means which detects film sensitivity and generates a film sensitivity signal;
   e. an operation means responsive to the shutter time signal from the shutter time signal generating means, the object brightness signal and the film sensitivity signal for generating a diaphragm aperture signal for obtaining appropriate exposure;
   f. a diaphragm aperture control means responsive to the diaphragm aperture signal from said operation means to control the diaphragm aperture at the time of exposure;
   g. a fourth switching means which selects one out of the output signal from the operation means and the shutter time signal from the shutter time signal generating means, for providing an output of the one thus selected; and
   h. an indication circuit which is responsive to the output signal from said fourth switching means, having:
      a register means, for memorizing and reading out digital information being supplied from the operation circuit of a camera,
      a decoder means for converting the information read out at the register means into a signal for indicating said information, and
      an indication means which receives the signal from the decoder means for making digital indication of said information and for distinguishing the content of the information by a portion of said digital indication.

12. An indication system of a camera, comprising:
   a. a shutter time setting means;
   b. a shutter time signal generating means, coupled with said shutter time setting means for generating a shutter time signal;
   c. a diaphragm aperture setting means;

d. a diaphragm aperture signal generating means, coupled with said diaphragm aperture setting means for generating a diaphragm aperture signal;

e. a first switching means, which selects one out of said shutter time signal and said diaphragm aperture signal for determining a preference mode of photographing and for the one thus selected as an output;

f. an object brightness sensing means, which detects object brightness, for generating an object brightness signal;

g. a film sensitivity signal generating means, which detects film sensitivity, for generating a film sensitivity signal;

h. an operation means responsive to the output signal from said first switching means, said object brightness signal and said film sensitivity signal, for obtaining appropriate exposure, when the input from said first switching means is a shutter time signal, the diaphragm aperture signal being provided, while the shutter time signal is provided when the input from said first switching means is a diaphragm aperture signal;

i. a second switching means, which functions in association with said first switching means to have the shutter time signal from the shutter time signal generating means, the diaphragm aperture signal from the diaphragm aperture signal generating means, and the output signal from the operation signal supplied thereto, wherein the shutter time signal from the shutter time signal generating means and the diaphragm aperture signal are used as an output in a case of shutter time preference, and wherein the diaphragm aperture signal from the diaphragm aperture signal generating means and shutter time signal is an output from the operation means in the case of diaphragm aperture preference;

j. a third switching means, which is linked with said second switching means to have the two outputs of said second switching means supplied thereto, and uses the output from the operation circuit through said second switching means as the output of said third switching means;

k. an indication circuit, responsive to the output signal from said third switching means, comprising:
    a register means for memorizing and reading out digital information being supplied from the operation circuit of a camera,
    a decoder means which converts the information read out with the register means into such signal for indicating the information, and
    an indication means, which receives the signal from the decoder means to make digital indication of said information for distinguishing the content of information by a portion of said digital indication.

13. An indication system of a camera according to claim 11, further comprising a fourth switching means which selects one out of the output signal from preference mode and the output signal of said operation means for supplying the one thus selected.

14. An indication system of a camera according to claim 11, further comprising:
    a. a shutter time control means, which is responsive to the shutter time signal from said second switching means to control shutter time at the time of exposure, and
    b. a diaphragm aperture control means, which has the diaphragm aperture signal from said second switching means supplied thereto for controlling diaphragm aperture at the time of exposure.

* * * * *